INVENTORS
George Borchin
Ernest A. Smith
BY
ATTORNEYS

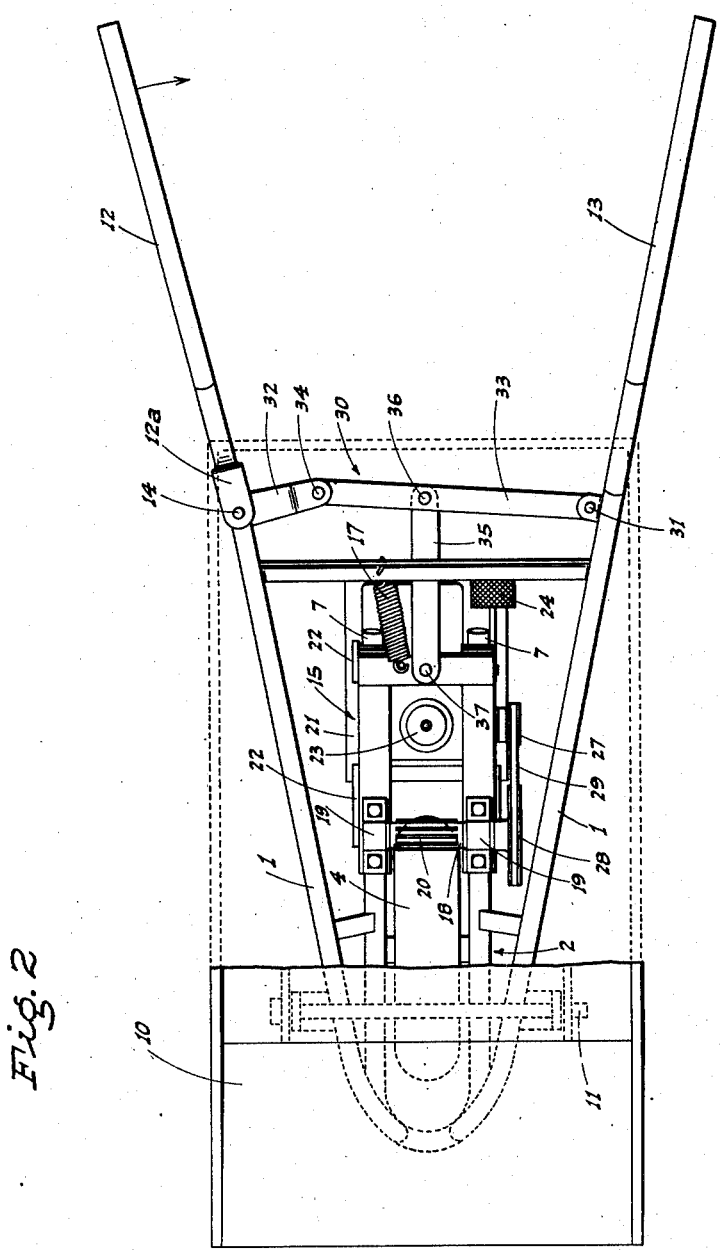

Patented May 12, 1953

2,638,172

UNITED STATES PATENT OFFICE 2,638,172

POWER DRIVEN WHEELBARROW

George Borchin and Ernest A. Smith,
Mokelumne Hill, Calif.

Application February 7, 1950, Serial No. 142,922

2 Claims. (Cl. 180—19)

This invention is directed to, and it is an object to provide, a power driven wheelbarrow of novel construction.

Another object of the invention is to provide a power driven wheelbarrow which embodies a novel drive mechanism between the included engine and front wheel of the wheelbarrow; such mechanism being shiftable between a non-driving position and a driving position, and said shifting being accomplished by lateral motion of one of the handles of the wheelbarrow.

A further object of the invention is to provide a power driven wheelbarrow, as above, wherein said drive mechanism includes a slide frame adapted to be advanced or retracted by the laterally movable handle; the engine being suspended from the slide frame and actuating a transverse shaft adapted to frictionally engage the front wheel, in driving relation, upon advance of said slide frame.

An additional object of the invention is to provide a power driven wheelbarrow which is extremely convenient to use, and which greatly lessens the labor required to transport material, especially heavy loads, in the wheelbarrow from point to point.

Still another object of the invention is to provide a power driven wheelbarrow which is designed for ease and economy of manufacture.

Another object of the invention is to provide a practical and reliable power driven wheelbarrow, and one which will be exceedingly effective for the purpose for which it is designed.

These objects are accomplished by means of such structure and relative arrangement of parts as will fully appear by a perusal of the following specification and claims.

Fig. 2 is a top plan of the same, with the body partly broken away.

Figure 1:
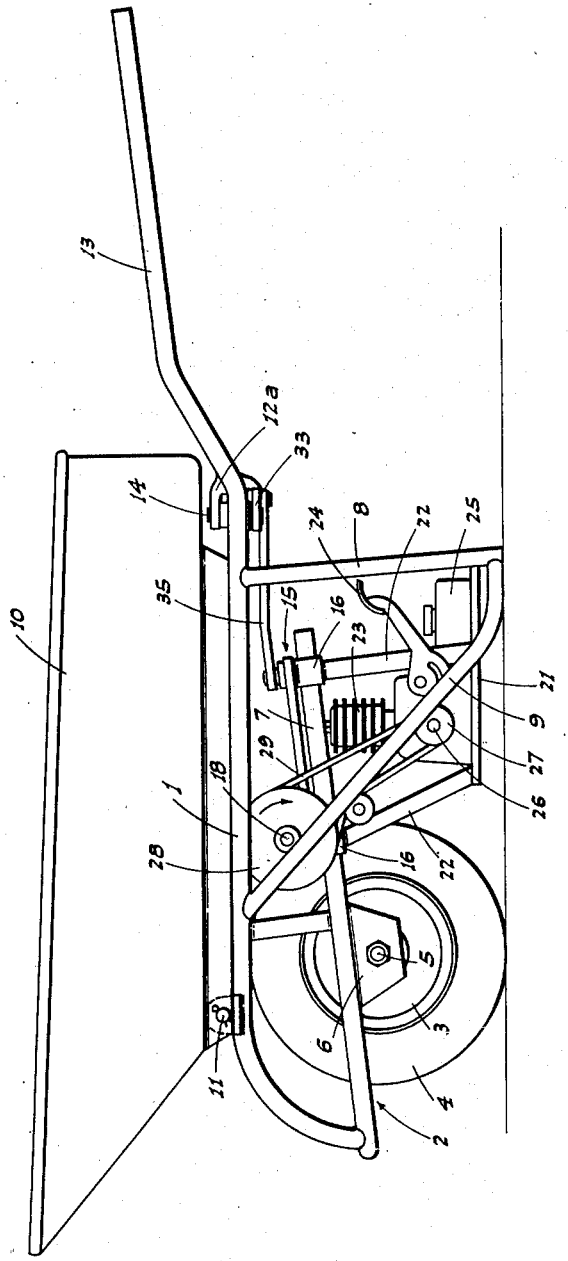
Fig. 1 is a side elevation of the power driven wheelbarrow.

Referring now more particularly to the characters of reference on the drawings, the novel, power driven wheelbarrow comprises a longitudinally extending main frame 1 including a longitudinal sub-frame 2 of elongated U-shape, with the closed end foremost; said sub-frame being below the remaining portion of the main frame.

The wheelbarrow is supported, adjacent the front, by a wheel 3 having a pneumatic tire 4 thereon; said wheel being carried on a spindle 5 which extends between brackets 6 which depend from opposite sides of the sub-frame 2. The wheel thus runs, at the upper portion, between opposite sides of said sub-frame 2, which opposite sides include rearwardly projecting parallel but transversely spaced mounting rods 7, whose purpose will hereinafter appear.

Rearwardly of the mounting rods 7 the main frame 1 is supported from the ground by transversely spaced rear legs 8 diagonally braced as at 9.

The main frame 1 supports, on top thereof, a material carrying body 10 which may be fixed to said main frame, or pivoted thereto, as at 11, for tilt-dumping.

A pair of handles, indicated at 12 and 13, project in diverging relation from the rear end of the main frame 1; the handle 12 being mounted for laterally inward swinging motion from a normal position, and the mount for this purpose including a clevis 12a pivoted, as at 14, in connection with an adjacent portion of said main frame 1.

A slide unit, indicated generally at 15, is mounted on the parallel rods 7 for advancing motion from a retracted position; such slide unit 15 including slide collars 16 which encircle the rods 7.

A pull-back spring 17 is connected between a transverse part of the main frame and the rear end of the slide unit 15, tending to retract the latter.

At the front thereof the slide unit 15 is fitted with a transverse shaft 18 journalled in connection with opposite sides of said slide unit 15, as at 19; the shaft between said journals 19 being formed with a plurality of circumferentially spaced, outwardly projectings ribs 20 which extend lengthwise of said shaft. The ribbed portion of the shaft 18 is adapted to engage the pneumatic tire 4, in driving relation to the wheel 3, upon advance of the slide unit 15 to a predetermined extent.

The transverse shaft 18 is driven in the following manner:

A horizontal platform 21 is disposed between the braces 9 and is suspended from the slide unit 15 by corner suspension bars 22, whereby upon sliding motion of said unit 15 the platform 21 likewise travels.

A small gas engine 23 is mounted on the platform 21; such gas engine including a starting pedal 24, a fuel tank 25, and a lateral output shaft 26.

A relatively small-diameter pulley 27 is fixed on the shaft 26, whereas a relatively larger pulley 28 is fixed on the corresponding end of the transverse shaft 18; there being an endless belt 29 extending between, and trained about, said pulleys. Thus, when the gas engine 23 is in operation a drive is imparted to the transverse shaft 18 in the direction indicated by the arrow in Fig. 1, whereby when the ribbed portion of said shaft is brought into engagement with the pneumatic tire 4 the wheel 3 is turned in a direction to move the wheelbarrow forwardly.

The following mechanism is employed to control motion of the slide unit 15 from the laterally swingable handle 12.

Toggle linkage, indicated generally at 30, extends transversely of the main frame 1 at its rear end; one end of said linkage being pivoted in common with the pivot 14, while the other end of said linkage is pivoted to the opposite side of the main frame, as at 31.

The linkage 30 includes links 32 and 33 pivotally connected at adjacent ends, as at 34; the link 32 being fixed in connection with the clevis 12a.

A longitudinal control link 35 is pivoted at its rear end, as at 36, to the link 33 and thence extends forwardly to pivotal connection, as at 37, to the rear end of the slide unit 15.

With the above arrangement laterally inward swinging motion of the handle 12 from a normal position causes the toggle linkage 30 to buckle forwardly, urging the longitudinal control link 35 in a corresponding direction whereby the slide unit 15 is advanced against the tension of the pull-back spring 17. As the slide unit 15 is advanced, the ribbed portion of the transverse shaft 18 engages the tire 4 and drives the wheel 3 in the manner previously described.

With the foregoing arrangement a workman, with both hands grasping the handles 12 and 13, has full and selective control of the drive of the wheelbarrow. At the outset the drive is disengaged, yet it requires only a slight laterally inward motion of the handle 12 to engage the drive with resultant forward travel of the wheelbarrow under power.

This control of the wheelbarrow is thus accomplished readily and conveniently, and with the wheelbarrow powered heavy loads can be transported with a minimum of effort on the part of the operator.

If it be desired that the wheelbarrow be used without the power arrangement, the link 35 and the pull-back spring 17 may be detached, whereby the slide unit 15, together with the engine and all the related mechanism, slide off the mounting rods 7; the wheelbarrow thereafter being usable in a conventional manner.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A power driven wheelbarrow comprising a barrow supporting frame, a wheel supporting the frame adjacent its forward end, transversely spaced barrow lifting and manipulating handles projecting rearwardly from the frame, means vertically hinging one handle at its forward end on the frame for lateral swinging movement toward the other handle from a normal position, a pair of parallel transversely spaced longitudinal members incorporated with the frame and projecting rearwardly of the wheel, a spring retracted slide unit mounted on the members, a power plant mounted on the unit and including a rotary driven element to drivingly engage the wheel, and linkage connected between said laterally movable handle and the slide unit to advance the latter so that the element engages the wheel upon such lateral movement of said handle; said linkage comprising an arm rigid with said handle at its hinged end and extending laterally toward the other handle, a transversely extending link connected between the inner end of said arm and the other handle, and a longitudinal link connected between the slide unit and the first named link.

2. A power driven wheelbarrow comprising a barrow supporting frame, a wheel supporting the frame adjacent its forward end, transversely spaced barrow lifting and manipulating handles projecting rearwardly from the frame, means vertically hinging one handle at its forward end on the frame for lateral swinging movement toward the other handle from a normal position, a pair of parallel transversely spaced longitudinal members incorporated with the frame and projecting rearwardly of the wheel, a spring retracted slide unit mounted on the members, a power plant mounted on the unit and including a rotary driven element to drivingly engage the wheel, and linkage connected between said laterally movable handle and the slide unit to advance the latter so that the element engages the wheel upon such lateral movement of said handle; said longitudinal frame members being free and disconnected from each other at their rear end and arranged to permit of withdrawal of the slide unit and power plant thereon from said members upon disconnection of the linkage from the slide unit.

GEORGE BORCHIN.
ERNEST A. SMITH.

References Cited in the file of this patent

UNITED STATES PATENTS

| Number | Name | Date |
|---|---|---|
| 1,598,124 | Evans | Aug. 31, 1926 |
| 1,831,367 | Rosenthal | Nov. 10, 1931 |
| 2,069,679 | Petmecky | Feb. 2, 1937 |
| 2,253,288 | De Lucchi | Aug. 19, 1941 |
| 2,433,709 | Rogers | Dec. 30, 1947 |

FOREIGN PATENTS

| Number | Country | Date |
|---|---|---|
| 445,238 | Germany | June 1, 1927 |